US012749266B2

(12) United States Patent
Shin et al.

(10) Patent No.: US 12,749,266 B2
(45) Date of Patent: Sep. 29, 2026

(54) SCANNING FRAMEWORK FOR MAPPING A SPACE

(71) Applicant: GOOGLE LLC, Mountain View, CA (US)

(72) Inventors: Dongeek Shin, San Jose, CA (US); Shiblee Hasan, Santa Clara, CA (US); Alon Hetzroni, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 183 days.

(21) Appl. No.: 18/584,887

(22) Filed: Feb. 22, 2024

(65) Prior Publication Data

US 2025/0272915 A1 Aug. 28, 2025

(51) Int. Cl.

| | |
|---|---|
| ***G06T 17/05*** | (2011.01) |
| ***G06T 7/10*** | (2017.01) |
| ***G06T 19/00*** | (2011.01) |
| ***G06T 19/20*** | (2011.01) |

(52) U.S. Cl.

CPC ................ *G06T 17/05* (2013.01); *G06T 7/10* (2017.01); *G06T 19/006* (2013.01); *G06T 19/20* (2013.01); *G06T 2207/10028* (2013.01); *G06T 2207/10052* (2013.01); *G06T 2207/20084* (2013.01); *G06T 2219/2016* (2013.01)

(58) Field of Classification Search

CPC ......... G06T 17/05; G06T 7/10; G06T 19/006; G06T 19/20

USPC .......................................................... 345/419

See application file for complete search history.

(56) References Cited

U.S. PATENT DOCUMENTS

| | | | | |
|---|---|---|---|---|
| 10,002,460 | B2 * | 6/2018 | Black | G06Q 30/0601 |
| 10,238,296 | B2 * | 3/2019 | Van Der Poel | A61B 5/0088 |
| 10,896,352 | B2 * | 1/2021 | Hsieh | G06N 3/045 |
| 10,970,930 | B1 * | 4/2021 | Olsen | G06T 7/70 |
| 11,748,940 | B1 | 9/2023 | Xian et al. | |
| 2018/0018805 | A1 * | 1/2018 | Kutliroff | G06V 20/20 |
| 2019/0147589 | A1 * | 5/2019 | Zhou | G06T 5/60 382/131 |
| 2022/0319106 | A1 | 10/2022 | Totty et al. | |
| 2023/0106652 | A1 | 4/2023 | Fieldman | |
| 2023/0131366 | A1 * | 4/2023 | Bigos | G06T 7/62 382/275 |
| 2023/0281955 | A1 * | 9/2023 | Ackerson | G06T 17/00 382/274 |
| 2024/0330136 | A1 * | 10/2024 | Furlong | G06F 11/2273 |

OTHER PUBLICATIONS

International Search Report and Written Opinion for PCT Application No. PCT/US2025/017009, mailed on May 20, 2025, 17 pages.

(Continued)

*Primary Examiner* — Thomas J Lett

(74) *Attorney, Agent, or Firm* — Brake Hughes Bellermann LLP

(57) ABSTRACT

Disclosed implementations generate a virtual representation of a space based on a model. The model is updated with image data according to a difference metric. The difference metric is determined for a portion of the space based on the image data and a current state of the model. The virtual representation is provided to a user device.

20 Claims, 7 Drawing Sheets

(56) References Cited

OTHER PUBLICATIONS

Huang, et al., "C-NERF: Representing Scene Changes as Directional Consistency Difference-Based NERF", arXiv:2312.02751v2, Dec. 23, 2023, 16 pages.
Taneja, et al., "Image Based Detection of Geometric Changes in Urban Environments", 2011 IEEE International Conference on Computer Vision, 2011, pp. 2336-2343.
Tanev, et al., "Virtual Studio Technology Inside Music Production", ICT Innovations 2013, Advances in Intelligent Systems and Computing; https://www.researchgate.net/publication/278073560_Virtual_Studio_Technology_inside_Music_Production, Jan. 2014, pp. 231-232.

* cited by examiner

SCANNING FRAMEWORK FOR MAPPING A SPACE

BACKGROUND

Augmented reality (AR) and virtual reality (VR) are prominent technologies revolutionizing a wide range of industries and transforming how users interact with and consume digital content.

SUMMARY

Implementations of the present disclosure are generally directed to generating and maintaining models that represent a real-world space and can be used to provide a virtual representation of the space (e.g., a room, a cubicle, a chamber, an alcove, a court, an entrance, a passage, and the like) to a device (e.g., a user device). The device can be a computing device (e.g., a mobile device, a laptop computing device, a head-mounted display (HMD) device, a mixed reality (XR) device such as an augmented reality (AR) and/or virtual reality (VR) device). These systems may receive image data from an imaging device (e.g., a camera) and determine a difference metric for a portion of the space represented by the model. The image data is updated with the image data or a portion of the image data specific to the portion of the space. Accordingly, these systems map (e.g., map when triggered by a condition, periodically map, continually map) the real-world space to the virtual representation of the real-world space, which decreases the discrepancy between the real-world space and the virtual representation when, for example, a user interacts with the virtual representation via the device.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF THE DRAWINGS

The following detailed description that sets forth aspects of the subject matter, along with the accompanying drawings of which.

DETAILED DESCRIPTION

Figure 1A:
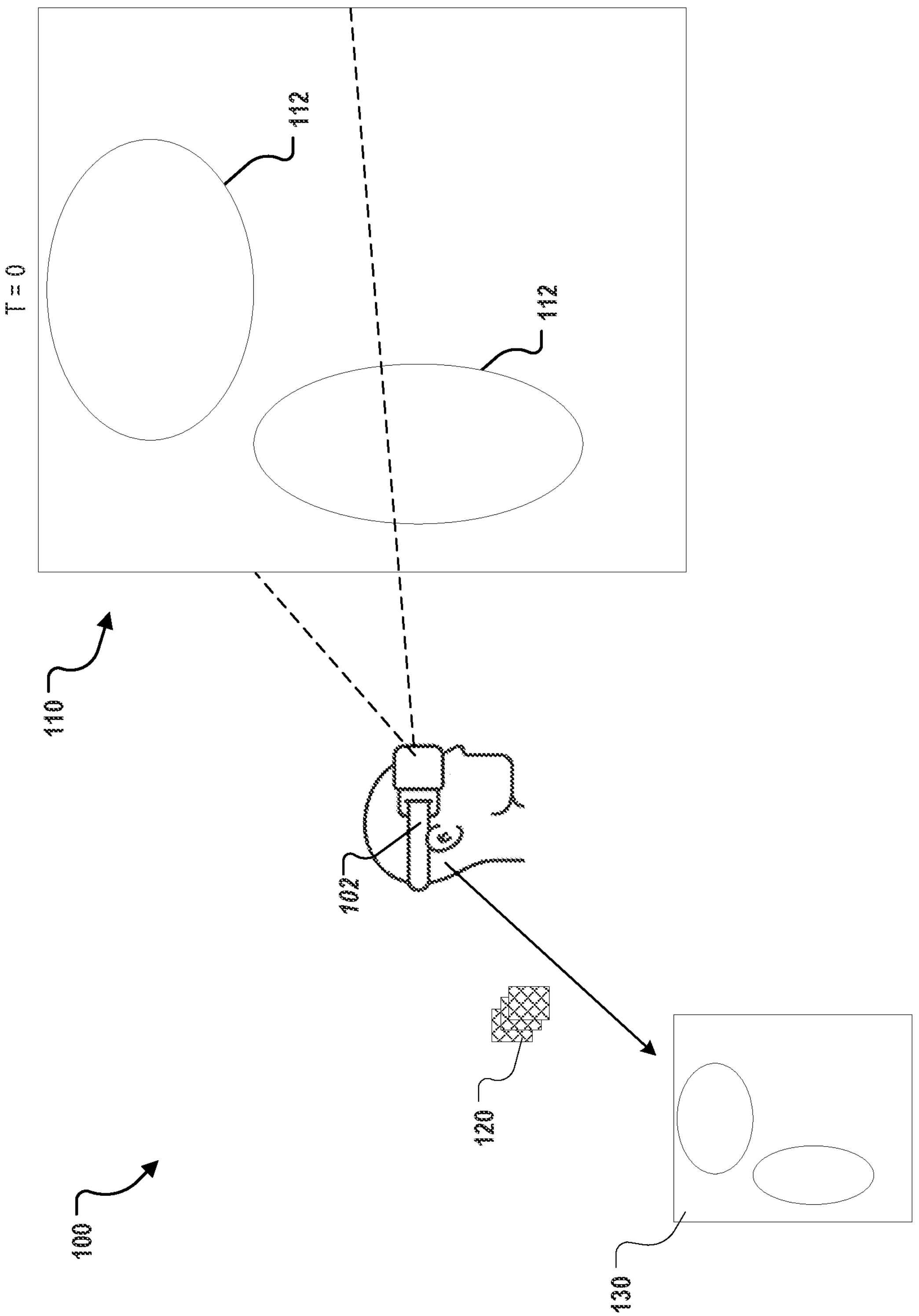
FIGS. 1A and 1B show an example environment where a device is employed to generate and update a model that represent a space, according to implementation as the described scanning system.

Computing systems (e.g., mobile devices, laptop computing devices, XR, augmented, and/or virtual reality (VR) systems) allow users to experience content in a space (e.g., a room, a cubicle, a chamber, an alcove, a court, an entrance, a passage, and the like) using a computing device (e.g., a mobile device, a laptop computing device, an HMD, XR device, AR device, VR device) configured to present a virtual environment. For example, computing systems can be configured to allow users to experience content in a three-dimensional (3D) space using a computing device configured to present a 3D environment (e.g., a virtual 3D environment). A 3D environment may include 3D assets representing virtual objects and a 3D model of a space or partition of a larger environment in the real world generated from a scan. For example, a user can work in a virtual representation of their physical office using a headset device (e.g., head-mounted device) in any location. Some systems allow a user to load a pre-scanned an asset (e.g., via a user interface) with a rendering journey. At least one technical problem with this approach is that the scanned space is static and therefore the discrepancy between the real and virtual space increases as time passes. For example, when someone moves or adjusts the position of an object within a space after an initial scan, a discrepancy (the position of the moved object) exists between the real-world space and the virtual representation. Moreover, the scanning of a space with a device takes a considerable amount of time and is not user-friendly as generating a virtual representation via a model takes a multitude of images.

The implementations described herein provide at least one technical solution to these technical problems. In particular, implementations of the described system provide a scanning framework for mapping (e.g., mapping when triggered by a condition, periodically mapping, continually or continuously mapping, continually or continuously mapping for a period of time) a real-world space to a virtual space with little discrepancy between them. In some implementations, the virtual space is represented by a common asset or model (e.g., a neural radiance field (NeRF) model that can be used to generate a rendering of the virtual space via a point cloud, light field, and/or so forth). The initial build of the model may be generated quickly (e.g., within seconds) based on an initial scan with relatively few (e.g., less than 100, less than 1000, less than 10,000, and the like) images and provide a rough scene reconstruction of the respective space. In some implementations, the model can be generated and store locally on a user device (e.g., a headset) and updated based on semantic difference computation methods in order to more accurately reflect the current state of the respective real-world space. Generally, semantic difference computation methods compare information (e.g., features or objects associated with a space) to determine differences between or among groupings. Semantic difference computation methods define metrics for feature points in a space at time zero versus the feature points coming at another time T. Specifically, the described scanning system is configured to determine a difference metric for a mapped, 3D space, and information collected from the space (e.g., via headset) based on semantic difference computation methods. The virtual model may then be updated with the image data (or a subset of the image data) based on the difference metric.

In some implementations, the described scanning system does not involve explicit scanning of a space by a user. Instead, scanning may be employed where, for example, data received from a sensor, such as an outward facing camera, of a device is processed as the device is used or worn to generate a 3D representation of the space. Accordingly, because the responsibility for scanning a space is shifted from the user to the described scanning system, which passively records data as the device is in use, the device experience does not change from the user point of view. Moreover, scanning and setup time decreases, which provides users an on-the-go solution that is based on using the device.

In some implementations, as a user uses a device (e.g., a headset set to pass through mode) the scenes and objects recorded in the image data are passively and dynamically stitched together to build and update a model. Once a model is generated from a space, the scanning system is configured to process incoming image data to correspond with (e.g., match) features of a real-world space with the respective model and employs semantic difference computation methods to determine a difference metric between the two. The model may then be updated, spatially and/or temporally, with the image data (or a subset of the image data) based on the difference metric. Accordingly, users do not have to identify a space nor provide labels for objects within the space when generating and/or updating the respective model.

Figure 1B:
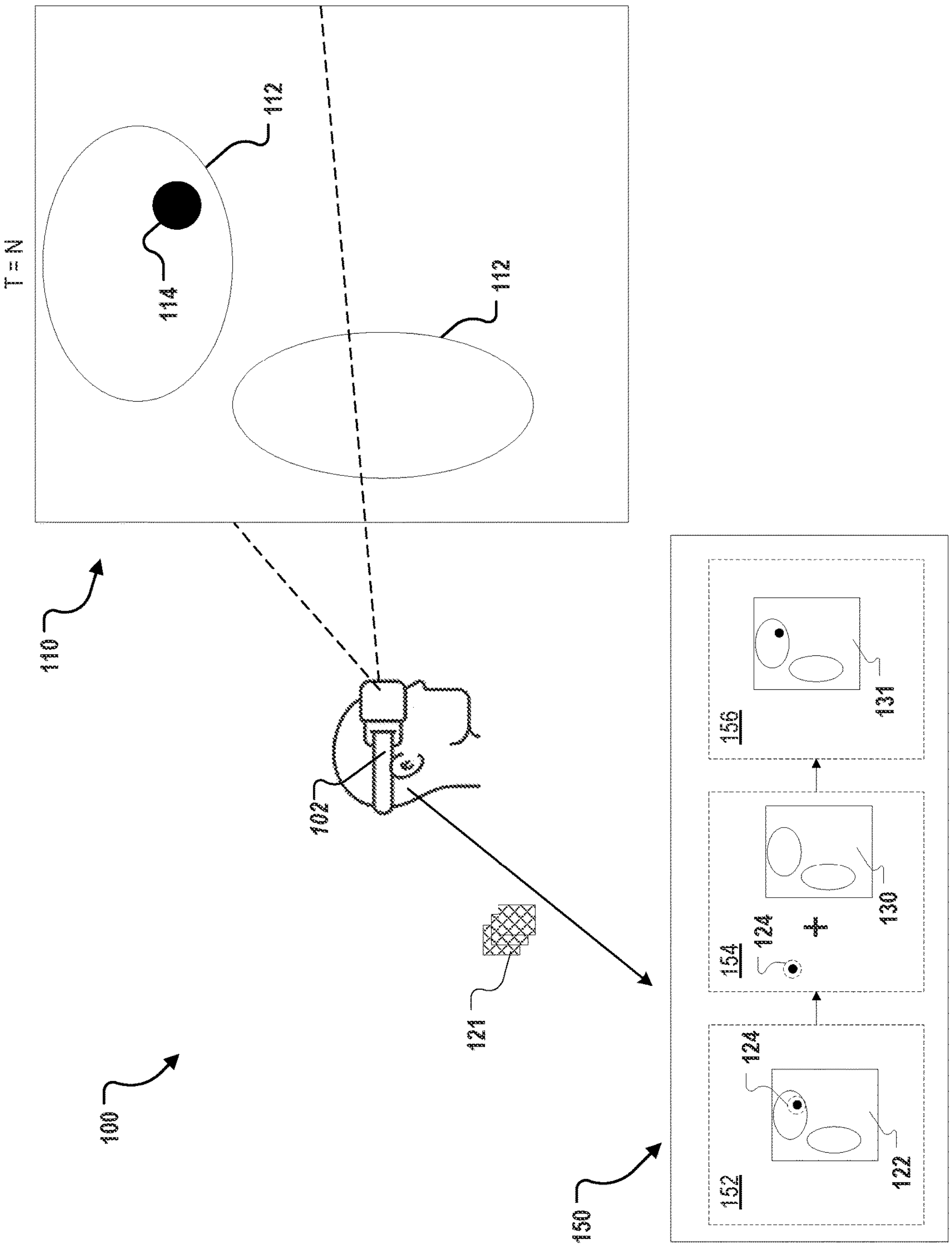

FIGS. 1A and 1B show an example environment 100 where a device 102 (e.g., a headset) is employed to generate a model 130 that represent a space 110 (FIG. 1A) and update the model 130 to an updated model 131 (FIG. 1B) according to implementation of the described scanning system. As depicted, the space includes features 112.

FIG. 1A shows the device 102 capturing an initial set of image data 120 of the space 110 and features 112 within the space 110 at some initial time (time 0). The model 130 is generated with the initial set of image data 120 according to implementation of the described scanning system.

FIG. 1B shows the device 102 capturing an additional set of image data 121 of the space 110 and features 112 at some later time (time N). The additional set of image data 121 includes information related to a new feature 114 in the space 110.

As depicted in FIG. 1B, process 150 shows an example series of steps for how the model 130 can be updated based on the additional set of image data 121. At step 152, the additional set of image data 121 is processed to determine a representation 122 of the space 110 at time N (the timeframe for the second scan by the device 102). The representation 122 is compared to the current model 130 of the space 110 to determine a difference metric for an area or region 124 in the space 110 that includes the new feature 114. At step 154, based on the difference metric and a threshold value, the scanning system is configured to update the model 130 with the additional set of image data 121. More specifically, in some implementations, a subset of the additional set of image data 121 that includes information related to the new feature 114 or the area surrounding the new feature 114, is identified (as area or region 124). At step 156, the model 130 is updated to model 131, which represents the space 110 at time N. Accordingly, the discrepancy between the real-world space 110 and the virtual representation by the model, now model 131, is decreased.

For simplicity, the additional set of image data 121 is depicted and described as having information related to this new feature 114; however, the additional set of image data 121 may (e.g., may also, may only) include information related a change to a feature (e.g., a new position of one of the features 112). In the described implementations, the model 130 is updated with additional set of image data 121 according to the process 150 to represent these changes in a similar manner.

Figure 2:
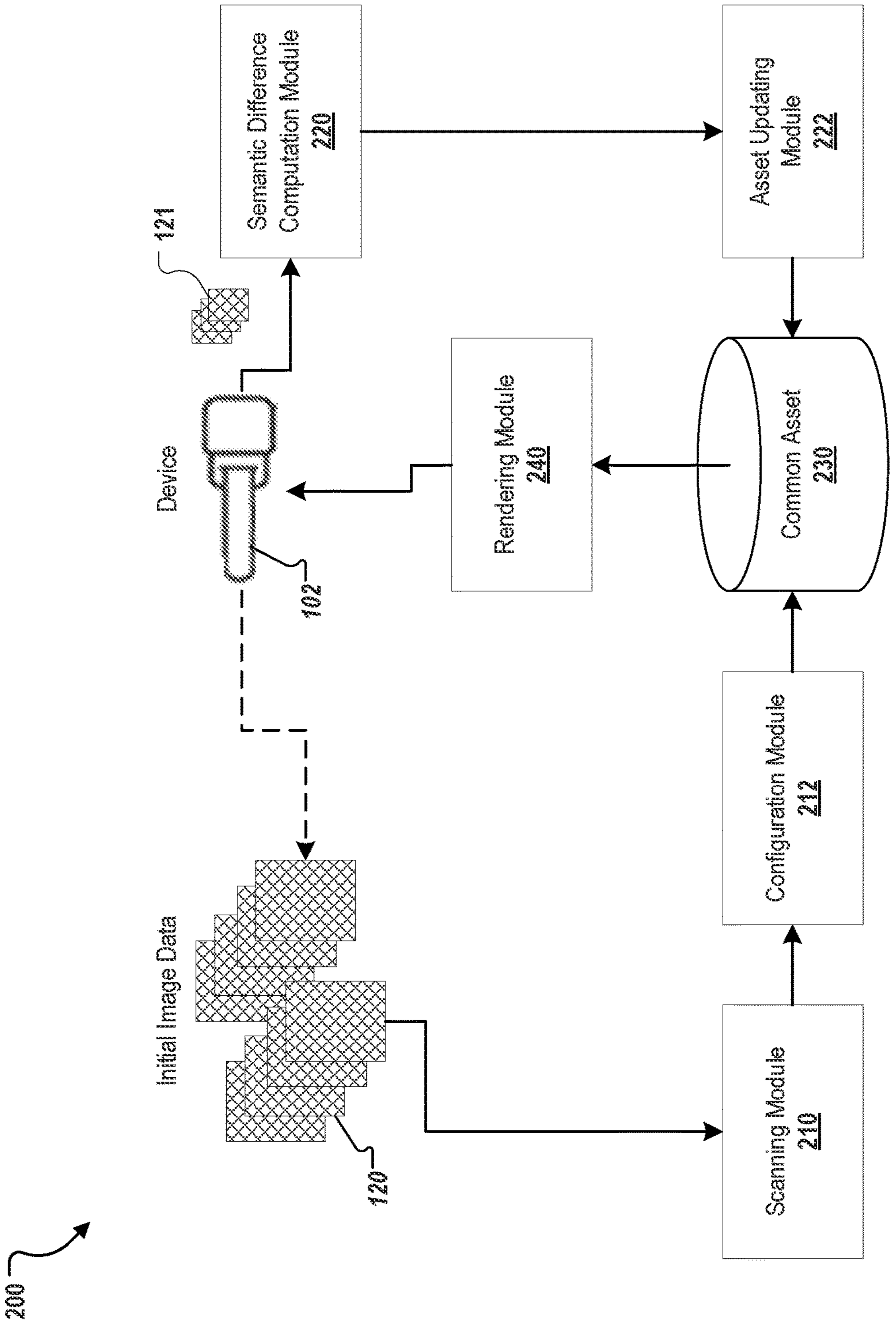
FIG. 2 is an example architecture that can be employed to execute implementations of the present disclosure.

FIG. 2 is an example architecture 200 for the described scanning system. As depicted, the example architecture 200 includes the device 102, scanning module 210, training module 212, semantic difference computation module 220, asset updating module 222, common asset 230, and rendering module 240. The device 102 is sustainably similar to computing device 610 depicted below with reference to FIG. 6. Moreover, in the figures and descriptions included herein device 102 is an AR/VR headset type device, however, it is contemplated that implementations of the present disclosure can be realized with any of the appropriate computing device(s), such as those the user computing devices 402, 404, 406, and 408 described below with reference to FIG. 4. In some implementations, the modules 210, 212, 220, 222, and 240 are executed via an electronic processor of the device 102. In some implementations, the modules 210, 212, 220, 222, and 240 are provided via a back-end system (such as the back-end system 430 described below with reference to FIG. 4) and the device 102 is configured to communicate with the back-end system via a network.

In some implementations, the scanning model 210 receives the initial set of image data 120. As described above with reference to FIGS. 1A and 1B, the initial set of image data 120 may be collected by the device 102 during an initial scan of a space such as the space 110. The device may include a headset or mobile device and includes an imaging sensor/device (e.g., a camera). In some implementations, the device 102 includes one or more video see through (VST) cameras and the set of image data 120 is a red, green, and blue (RGB) reading provided by the cameras. In some implementations, the device 102 is configured to prompt the user to begin building the virtual representation for the space and/or provide instructions to a user for conducting an initial scan. In some implementations, the initial scan is performed passively as the user uses the device 102.

In some implementations, the configuration module 212 generates the common asset 230. In some implementations the configuration module 212 generates the common asset 230 based on the image data 120, which is received from the scanning module 210. The common asset 230 is a representation, such as a light field data structure, of a real-world space or spaces generated from an active model, such as a dense NeRF model, of the real-world space or spaces. In some implementations, the common asset 230 is a model (e.g., a dense NeRF model). The common asset 230 is determined based on image data (e.g., the initial set of image data 120 and subsequently received sets of image data 121) of the real-world space. In some implementations, the configuration module 212 generates the common asset 230 based on a number of images in an initial scan. In such examples, the common asset 230 may have missing information or a rough scene reconstruction for the respective real-world space. In passive mode, for example, the device 102 may provide virtual features or items to attract the attention of the user and collect an additional set of image data 121, which is processed by the configuration module 212 to update the common asset 230. For example, the configuration module 212 may determine that a particular area or region in the space represented by the common asset 230 is incomplete (e.g., lacking sufficient information) based on a determined confidence score, and the device 102 may be configured to provide a virtual feature in the direction of the area (e.g., via a display) to cause the user to look toward the area (and therefore point the imaging device toward the area) to collected additional images from the area. To state another way, the device 102 can be configured to mask the directions to the user to collect more information for the virtual representation instead of, for example, showing the virtual space with holes or missing elements/features. In some implementations, the configuration module 212 is configured to initially fill in gaps in a generated model based on data collected from a similar environment. For example, when a side of an object or area in the space is not included in the initial set of image data 120, the configuration module 212 identifies similar elements or features in a set of common/training images to fill in the gaps until more information is collected from the device 102 (e.g., by the semantic difference computation module 220).

Once the common asset 230 is built, in some implementations, the semantic difference computation module 220 processes additional sets of image data 121 collected by the device 102 as the device is used (e.g., in passthrough mode). In some implementations, the semantic difference computation module 220 determines a difference metric for an area or areas of the common asset 230. The difference metric is a measure of a difference between the area in the real-world at a time N (determined according to the set of image data 121 collected at time N) and a current state of the common asset 230 (or a state of the common asset at a particular time). In some examples, the semantic difference computation module 220 processes incoming additional set of image data 121 to determine whether the common asset 230 includes a virtual representation of the real-world space represented in the set of image data 121 (e.g., has the model been generated for the real-world space). In some implementations, when no virtual representation is found, the semantic difference computation module 220 provides the set of image data 121 to the scanning module 210 as the initial set of image data 120.

Figure 3:
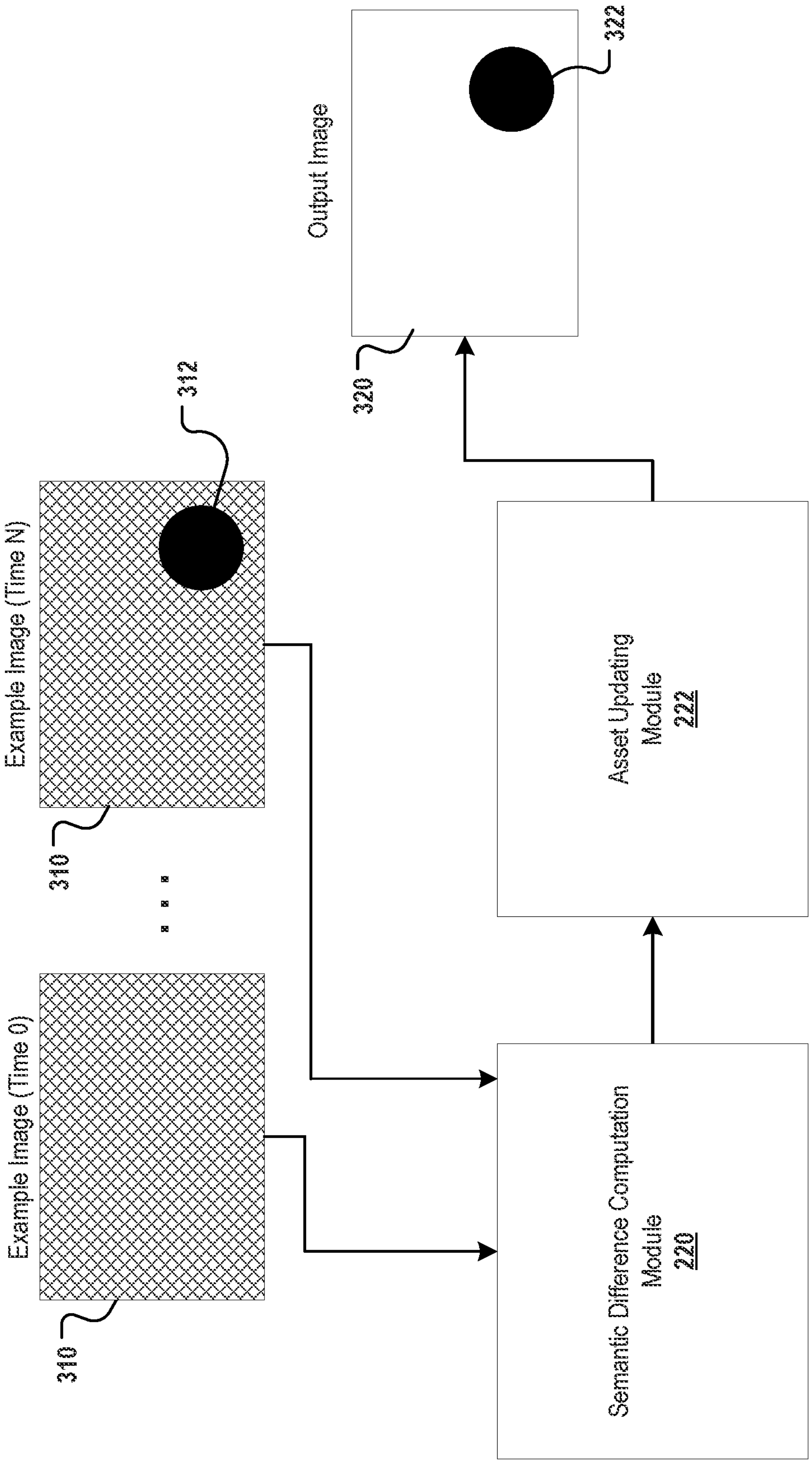
FIG. 3 is an example implementation for two of the modules from the example architecture of FIG. 2.

Turning to FIG. 3, in some implementations, the semantic difference computation module 220 is configured to compare the difference metric for a particular area in the space to a threshold value. The threshold value includes a limit or boundary to which to compare the difference metric in order to determine whether to update the common asset 230. In some implementations, the threshold value is configurable (e.g., by a user) and may be set based on the type of model user to build the common asset 230, the granularity of the common asset 230, sensor or device specification (e.g., of the device 102 or the sensors of the device 102), user preferences, and the like. For example, the threshold value may represent an amount of change (e.g., as a percentage or an absolute value) in a region of a model that triggers integrating information from collected image data into the model.

In an example implementation, the semantic difference computation module 220 is configured to execute an image-based segmentation scheme for the (e.g., each) received image 310 (e.g., provided by the device 102). In the example implementation, the semantic difference computation module 220 is configured to compute a nearest-neighbor segmentation difference between segmented images (depicted in FIG. 3 at time 0 and time N). In the example implementation, to determine whether the scene depicted in the received image 310 at time N includes a new object or semantics (e.g., show as region or area 312), the semantic difference computation module 220 is configured to compare this determined difference against a threshold value. Based on the threshold value (e.g., the difference metric is above the threshold value), the semantic difference computation module 220 is configured to provide the set of image data 121 to the asset updating module 222.

Returning to FIG. 2, in some implementations, the semantic difference computation module 220 is configured to determine a subset of the set of image data 121 associated with particular area in the space (e.g., the set of image data 121 that includes information within a set radius of the area) associated with the difference metric and provide the subset of the image data to the asset updating module 222. In some implementations, the asset updating module 222 is configured to update the common asset 230 based on the set of image data 121 (or subset of the set of image data 121). For example, when the common asset 230 is an NeRF model, the set of image data 121 (or subset of the set of image data 121) is incremental NeRF input. In some implementations, the asset updating module 222 is configured to modify the identified area (based on the difference metric associated with the area), by choosing the interpolate towards the local surgery values in the common asset 230. In some implementations, the semantic difference computation module 220 is configured to update elements of the common asset 230 based on a weighted average that reflects a confidence metric determined according to the difference metric and the threshold when a new object of feature is discovered. For example, the confidence metric may be determined based on the delta (e.g., a measure of the difference or change) between the difference metric and the threshold value. For example, the confidence metric can be a numeric value (e.g., a percentage or an absolute value) that represents a level of confidence based on the delta, which is a numeric value (e.g., a percentage or an absolute value) the represents a difference between the difference metric and the threshold value.

In the example depicted in FIG. 3, the output image 320 provided by the asset updating module 222, includes the differential semantics portions, which are highlighted as 322. In an example implementation, the identified area 312 is first polled in world-space around a geometric point (e.g., a centroid). A local NeRF reconstruction (e.g., NeRF model) is then made around the point within a set radius using the previous image(s) 320. The resulting image 320 is either swapped with the existing common asset 230 in that radius or interpolated within the common asset 230 (e.g., a convex interpolation to a four-dimensional (4D) light field space represented by a*local_nerf_old+(1−a)*local_nerf_new).

Returning to FIG. 2, the rendering module 240 is configured to generate a virtual rendering of a space based on the common asset 230 and provide the virtual rendering to the device 102 for viewing. In some implementations, the rendering module 240 is configured to generate a biocular rendering based on the common asset 230. In some implementations, the rendering module 240 may determine a light-field or a point cloud for a space based on the common asset 230, which can then be employed to determine the virtual rendering. Because the common asset 230 is updated, the virtual rendering provided by the rendering module 240 more closely aligns to the current state (or state representative at some time T) of the respective real-world space. In some implementations, rendering module 240 is configured to provide visual effects, such as shading techniques (e.g. gently fading away objects) or light-field flow methods (e.g. natural movement during a time interval) based on the common asset 230. In some implementations, the rendering module 240 is configured to provide multiple renderings for a space. For example, a heat map may be used to identify separate common configurations for a space. In such implementations, the rendering module 240 may be configured to provide the user with an option to select a particular configuration for a space.

Figure 4:
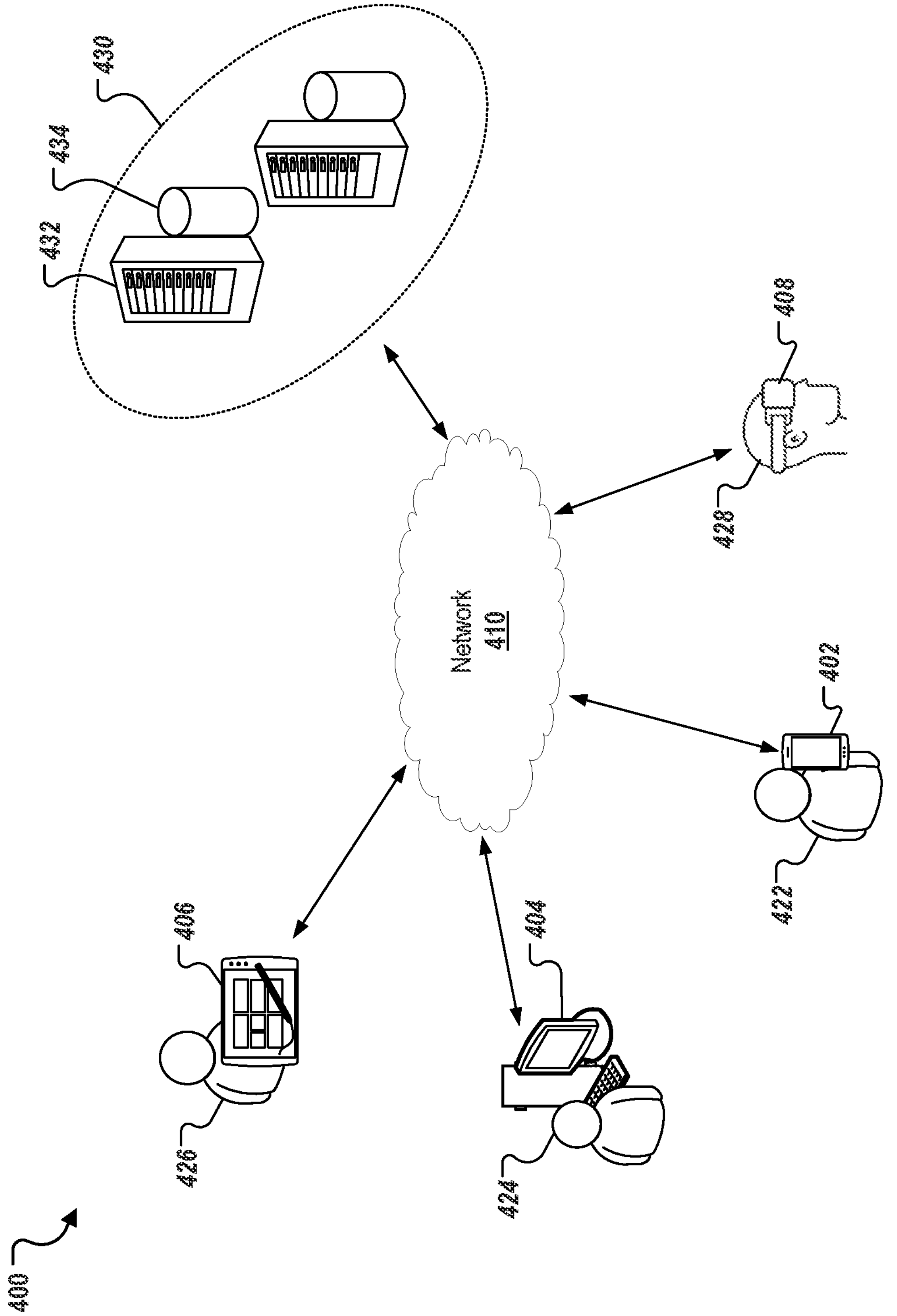
FIG. 4 depicts an example environment that can be employed to execute implementations of the present disclosure.

FIG. 4 depicts an example environment 400 that can be employed to execute implementations of the present disclosure. The example environment 400 includes computing devices 402, 404, 406, 408; a back-end system 430, and a communication network 410. The communication network 410 may include wireless and wired portions. In some cases, the communication network 410 is implemented using one or more existing networks, for example, a cellular network, the Internet, a land mobile radio (LMR) network, a BLUETOOTH network, a wireless local area network (for example, Wi-Fi), a wireless accessory Personal Area Network (PAN), a Machine-to-machine (M2M) network, and a telephone network. The communication network 410 may also include future developed networks. In some implementations, the communication network 410 includes the Internet, an intranet, an extranet, or an intranet and/or extranet that is in communication with the Internet. In some implementations, the communication network 410 includes a telecommunication or a data network.

In some implementations, the communication network 410 connects web sites, devices (e.g., the computing devices 402, 404, 406, and 408) and back-end systems (e.g., the back-end system 430). In some implementations, the network 410 can be accessed over a wired or a wireless communications link. For example, mobile computing devices (e.g., the smartphone device 402 and the tablet device 406), can use a cellular network to access the network 410.

In some examples, the users 422, 424, 426, and 428 interact with the system through a graphical user interface (GUI) (e.g., the user interface 625 described below with reference to FIG. 6) or client application that is installed and executing on their respective computing devices 402, 404, 406, or 408. In some examples, the computing devices 402, 404, 406, and 408 provide viewing data (e.g., a virtual representation of a space) to screens with which the users 422, 424, 426, and 426, can interact. In some examples, the computing devices 402, 404, 406, and 408 provide a virtual representation of a space (e.g., via a headset or an earpiece) determined according to implementation of the described system (e.g., based on a model generated from collected image data). In some implementations, the computing devices 402, 404, 406 and 408 are sustainably similar to the computing device 610 described below with reference to FIG. 6. The computing devices 402, 404, 406, and 408 may include (e.g., may each include) any appropriate type of computing device, such as a desktop computer, a laptop computer, a handheld computer, a tablet computer, a personal digital assistant (PDA), an augmented reality (AR)/virtual reality (VR) device, a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

Four user computing devices 402, 404, 406 and 408 are depicted in FIG. 4 for simplicity. In the depicted example environment 400, the computing device 402 is depicted as a smartphone, the computing device 404 is depicted as a tablet-computing device, the computing device 406 is depicted as a desktop computing device, and the computing device 408 is depicted as an AR/VR device. It is contemplated, however, that implementations of the present disclosure can be realized with any of the appropriate computing devices, such as those mentioned previously. Moreover, implementations of the present disclosure can employ any number of devices.

In some implementations, the back-end system 430 includes at least one server device 432 and optionally, at least one data store 434. In some implementations, the server device 432 is sustainably similar to computing device 610 depicted below with reference to FIG. 6. In some implementations, the server device 432 is a server-class hardware type device. In some implementations, the back-end system 430 includes computer systems using clustered computers and components to function as a single pool of seamless resources when accessed through the communications network 410. For example, such implementations may be used in data center, cloud computing, storage area network (SAN), and network attached storage (NAS) applications. In some implementations, the back-end system 430 is deployed using a virtual machine(s).

In some implementations, the data store 434 is a repository for persistently storing and managing collections of data (e.g. training data or image data that includes common elements, which can be employed to build or fill in missing elements of a model representing a real-world space). Example data stores that may be employed within the described system include data repositories, such as a database as well as simpler store types, such as files, emails, and so forth. In some implementations, the data store 434 includes a database. In some implementations, a database is a series of bytes or an organized collection of data that is managed by a database management system (DBMS).

In some implementations, the back-end system 430 hosts one or more computer-implemented services provided by the described system with which users 422, 424, 426, and 426 can interact using the respective computing devices 402, 404, 406, and 408. For example, in some implementations, the back-end system 430 is configured to generate and update a model for a real-world space and provide a virtual representation of the real-world space according to the model to the user computing devices 402, 404, 406, or 408.

Figure 5:
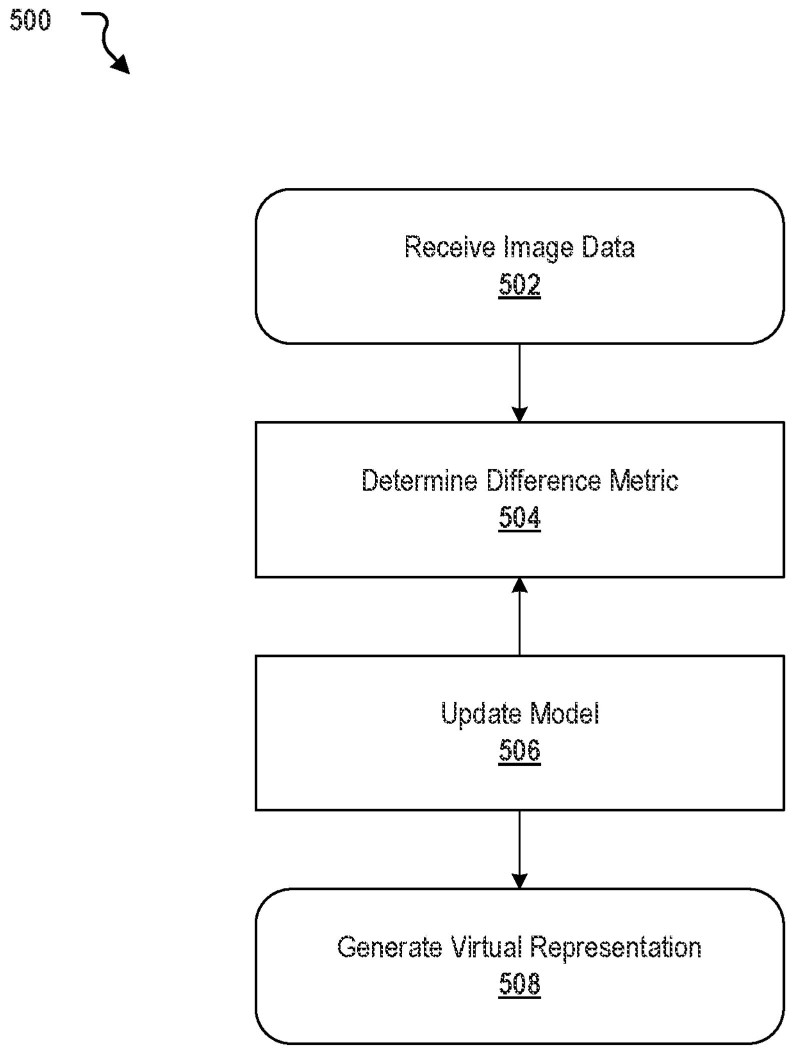
FIG. 5 depicts a flowchart of a non-limiting process that can be performed by implementations of the present disclosure.

FIG. 5 depicts a flowchart of an example process 500 that can be implemented by implementations of the present disclosure. The example process 500 can be implemented by systems and components described with reference to FIGS. 2-4 and 6. The example process 500 generally shows in more detail how a model representing real-world space is updated based on collected image data from the space.

For clarity of presentation, the description that follows generally describes the example process 500 in the context of FIGS. 1A-4 and 6. However, it will be understood that the process 500 may be performed, for example, by any other suitable system, environment, software, and hardware, or a combination of systems, environments, software, and hardware as appropriate. In some implementations, various operations of the process 500 can be run in parallel, in combination, in loops, or in any order.

At 502, image data of a space being represented as a model is received from an imaging device. In some implementations, the space comprises a room or partition of a larger environment.

From 502, the process 500 proceeds to 504 where a difference metric for a portion of the space is determined based on the image data and a current state of the model. In some implementations, the difference metric for the portion of the space is determined according to a semantic difference computation method. In some implementations, the semantic difference computation method defines a plurality of metrics for feature points from the portion of the space and compares the feature points in the image data with the feature points defined by the model. In some implementations, the semantic difference computation method compares the feature points in the image data with the feature points defined by the model according to a nearest-neighbor segmentation difference.

From 504, the process 500 proceeds to 506 where the model is updated to an updated model based on the image data and the difference metric. In some implementations, the model is updated to an updated model with a subset of the image data based on the difference metric and a threshold value. In some implementations, the subset of the image data includes the portion of the space and is determined according to the difference metric. In some implementations, the subset of the image data is integrated into the updated model according to a weighted value that reflects a delta between the difference metric and the threshold value. For example, an orientation or position of an object within a space may be represented in the virtual model according to the previous orientation or position of the object and a new orientation or position of the object in the collected image data. As simple illustration, an object that is represented as turned 90 degrees respective to another object in the space and 120 degrees respective to the other object in the images data, may be represented in the updated model with some value between 90 degrees and 120 degrees, respective to the other object, determined according to a weighted value (e.g., some information in the image data is weighted twice as much as corresponding information in the previous model such that the repositioned object is represented at 110 degrees from the other object in the updated model; the position of the object in the model will eventually match the position in the real-world (turned 120 degrees from the other object) with subsequent image data/updates). In some implementations, the subset of the image data is determined based on radius value and a location of the portion of the space.

From 506, the process 500 proceeds to 508 where a virtual representation of the space is generated based on the updated model. In some implementations, the model is generated based on an initial set of image data of the space received from the imaging device. In some implementations, the model comprises a neural radiance field model. In some implementations, the virtual representation of the space is provided to a user device for display. In some implementations, incomplete sections of the model are identified. In some implementations, a prompt to collect additional information is determined based on the incomplete sections of the model and the image data. In some implementations, the prompt is provided to the user device. In some implementations, the incomplete sections of the model are updated with image data collected from a similar environment. In some implementations, the user device comprises an AR/VR headset or a mobile device. In some implementations, the user device includes the imaging device. In some implementations, the virtual representation of the space is generated based on a point cloud or light field determined according to the updated model. In some implementations, virtual representation comprises a biocular rendering of the space. From 508, the process 500 ends or repeats.

Figure 6:
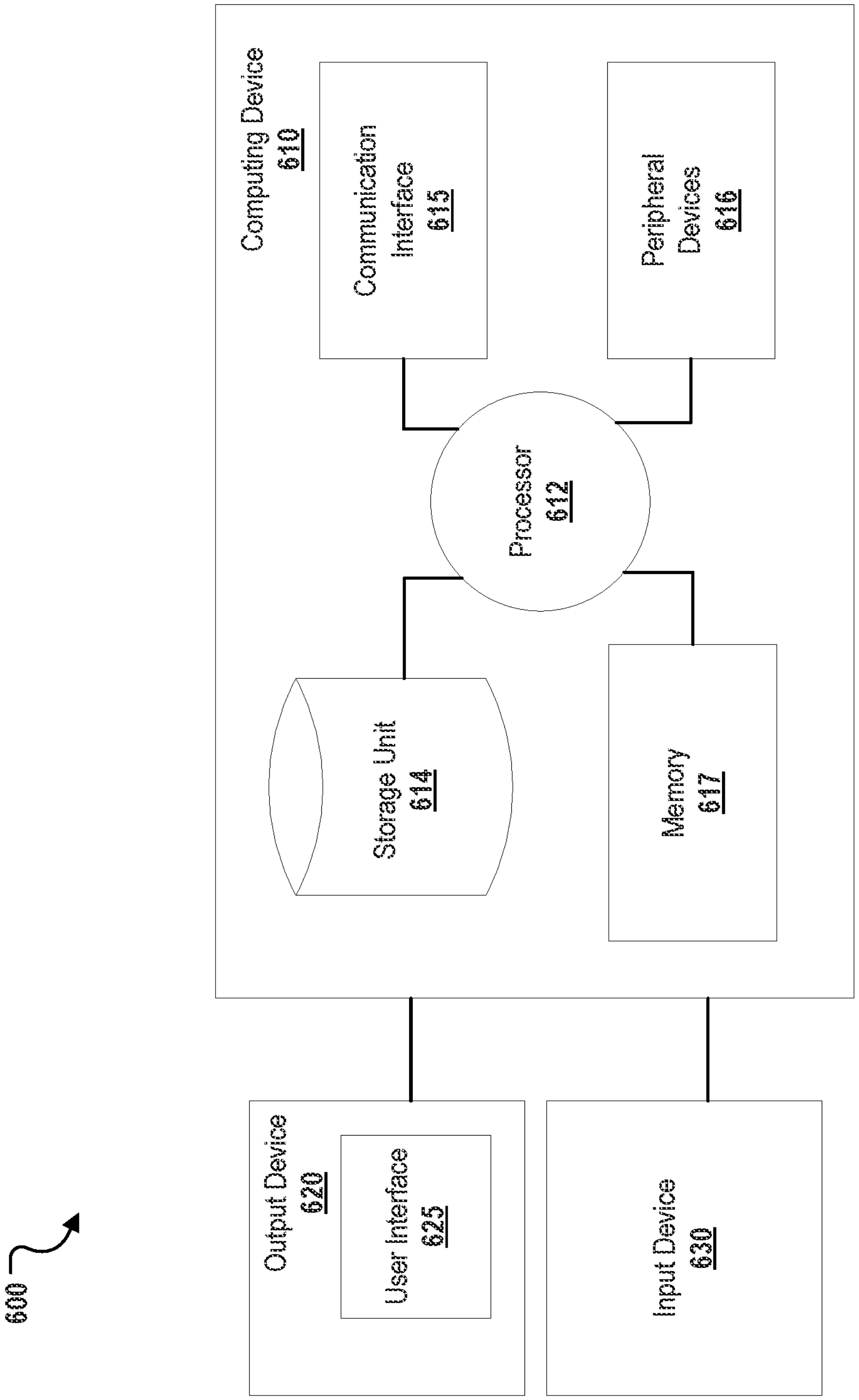
FIG. 6 depicts an example system that includes a computer or computing device that can be programmed or otherwise configured to implement systems or methods of the present disclosure.

FIG. 6 depicts an example computing system 600 that includes a computer or computing device 610 that can be programmed or otherwise configured to implement systems or methods of the present disclosure. For example, the computing device 610 can be programmed or otherwise configured to implement the process 500. In some cases, the computing device 610 includes an operating system configured to perform executable instructions. The operating system is, for example, software, including programs and data that manages the device's hardware and provides services for execution of applications.

In the depicted implementation, the computer or computing device 610 includes an electronic processor (also "processor" and "computer processor" herein) 612, such as a central processing unit (CPU) or a graphics processing unit (GPU), which is optionally a single core, a multi core processor, or a plurality of processors for parallel processing. The depicted implementation also includes memory 617 (e.g., random-access memory, read-only memory, flash memory), electronic storage unit 614 (e.g., hard disk or flash), communication interface module 615 (e.g., a network adapter or modem) for communicating with one or more other systems, and peripheral devices 616, such as cache, other memory, data storage, microphones, speakers, and the like. In some implementations, the memory 617, storage unit 614, communication interface module 615 and peripheral devices 616 are in communication with the electronic processor 612 through a communication bus (shown as solid lines), such as a motherboard. In some implementations, the bus of the computing device 610 includes multiple buses. The above-described hardware components of the computing device 610 can be used to facilitate, for example, an operating system and operations of one or more applications executed via the operating system. For example, a virtual representation of space may be provided via the user interface 625. In some implementations, the computing device 610 includes more or fewer components than those illustrated in FIG. 6 and performs functions other than those described herein.

In some implementations, the memory 617 and storage unit 614 include one or more physical apparatuses used to store data or programs on a temporary or permanent basis. In some implementations, the memory 617 is volatile memory and can use power to maintain stored information. In some implementations, the storage unit 614 is non-volatile memory and retains stored information when the computer is not powered. In further implementations, memory 617 or storage unit 614 is a combination of devices such as those disclosed herein. In some implementations, memory 617 or storage unit 614 is distributed across multiple machines such as a network-based memory or memory in multiple machines performing the operations of the computing device 610.

In some cases, the storage unit 614 is a data storage unit or data store for storing data. In some instances, the storage unit 614 stores files, such as drivers, libraries, and saved programs. In some implementations, the storage unit 614 stores data received by the device (e.g., image data and/or a common asset or model). In some implementations, the computing device 610 includes one or more additional data storage units that are external, such as located on a remote server that is in communication through a network (e.g., the network 410 described above with reference to FIG. 4).

In some implementations, platforms, systems, media, and methods as described herein are implemented by way of machine or computer executable code stored on an electronic storage location (e.g., non-transitory computer readable storage media) of the computing device 610, such as, for example, on the memory 617 or the storage unit 614. In further implementations, a computer readable storage medium is optionally removable from a computer. Non-limiting examples of a computer readable storage medium include compact disc read-only memories (CD-ROMs), digital versatile discs (DVDs), flash memory devices, solid state memory, magnetic disk drives, magnetic tape drives, optical disk drives, cloud computing systems and services, and the like. In some cases, the computer executable code is permanently, substantially permanently, semi-permanently, or non-transitorily encoded on the media.

In some implementations, the electronic processor 612 is configured to execute the code. In some implementations, the machine executable or machine-readable code is provided in the form of software. In some examples, during use, the code is executed by the electronic processor 612. In some cases, the code is retrieved from the storage unit 614 and stored on the memory 617 for ready access by the electronic processor 612. In some situations, the storage unit 614 is precluded, and machine-executable instructions are stored on the memory 617.

In some cases, the electronic processor 612 is a component of a circuit, such as an integrated circuit. One or more other components of the computing device 610 can be optionally included in the circuit. In some cases, the circuit is an application specific integrated circuit (ASIC) or a field programmable gate arrays (FPGAs). In some cases, the operations of the electronic processor 612 can be distributed across multiple machines (where individual machines can have one or more processors) that can be coupled directly or across a network.

In some cases, the computing device 610 is optionally operatively coupled to a communication network, such as the network 410 described above with reference to FIG. 4, via the communication interface module 615, which may include digital signal processing circuitry. Communication interface module 615 may provide for communications under various modes or protocols, such as global system for mobile (GSM) voice calls, short message/messaging service (SMS), enhanced messaging service (EMS), or multimedia messaging service (MMS) messaging, code-division multiple access (CDMA), time division multiple access (TDMA), wideband code division multiple access (WCDMA), CDMA2000, or general packet radio service (GPRS), among others. Such communication may occur, for example, through a transceiver. In addition, short-range communication may occur, such as using a BLUETOOTH, WI-FI, or other such transceiver.

In some cases, the computing device 610 includes or is in communication with one or more output devices 620. In some cases, the output device 620 includes a display to send visual information to a user. In some cases, the output device 620 is a touch sensitive display that combines a display with a touch sensitive element that is operable to sense touch inputs as and functions as both the output device 620 and the input device 630. In still further cases, the output device 620 is a combination of devices such as those disclosed herein. In some cases, the output device 620 displays a user interface 625 generated by the computing device.

In some cases, the computing device 610 includes or is in communication with one or more input devices 630 that are configured to receive information from a user. In some cases, the input device 630 is a keyboard. In some cases, the input device 630 is a keypad (e.g., a telephone-based keypad). In some cases, the input device 630 is a cursor-control device including, by way of non-limiting examples, a mouse, trackball, trackpad, joystick, game controller, or stylus. In some cases, as described above, the input device 630 is a touchscreen or a multi-touchscreen. In other cases, the input device 630 is a microphone to capture voice or other sound input. In other cases, the input device 630 is an imaging device such as a camera. In still further cases, the input device is a combination of devices such as those disclosed herein.

It should also be noted that a plurality of hardware and software-based devices, as well as a plurality of different structural components may be used to implement the described examples. In addition, implementations may include hardware, software, and electronic components or modules that, for purposes of discussion, may be illustrated and described as if most of the components were implemented solely in hardware. In some implementations, the electronic-based aspects of the disclosure may be implemented in software (e.g., stored on non-transitory computer-readable medium) executable by one or more processors, such as electronic processor 612. As such, it should be noted that a plurality of hardware and software-based devices, as well as a plurality of different structural components may be employed to implement various implementations.

It should also be understood that although certain drawings illustrate hardware and software located within particular devices, these depictions are for illustrative purposes only. In some implementations, the illustrated components may be combined or divided into separate software, firmware, or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Moreover, various implementations of the systems and techniques described herein can be realized in digital electronic circuitry, integrated circuitry, specially designed ASICs (application specific integrated circuits), computer hardware, firmware, software, or combinations thereof. These various implementations can include implementation in one or more computer programs that are executable or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include computer readable or machine instructions for a programmable electronic processor and can be implemented in a high-level procedural or object-oriented programming language, or in assembly/machine language. As used herein, the terms "machine-readable medium" and "computer-readable medium" refers to any computer program product, apparatus or device (e.g., magnetic discs, optical disks, memory, Programmable Logic Devices (PLDs)) used to provide machine instructions or data to a programmable processor, including a machine-readable medium that receives machine instructions as a machine-readable signal. The term "machine-readable signal" refers to any signal used to provide machine instructions or data to a programmable processor.

The functionality of the computer readable instructions may be combined or distributed as desired in various environments. In some implementations, a computer program includes one sequence of instructions. In some implementations, a computer program includes a plurality of sequences of instructions. In some implementations, a computer program is provided from one location. In other implementations, a computer program is provided from a plurality of locations. In various implementations, a computer program includes one or more software modules. In various implementations, a computer program includes, in part or in whole, one or more web applications, one or more mobile applications, one or more standalone applications, one or more web browser plug-ins, extensions, add-ins, or add-ons, or combinations thereof.

Unless otherwise defined, the technical terms used herein have the same meaning as commonly understood by one of ordinary skill in the art to which the present subject matter belongs. As used in this specification and the appended claims, the singular forms "a," "an," and "the" include plural references unless the context clearly dictates otherwise. Any reference to "or" herein is intended to encompass "and/or" unless otherwise stated.

A number of implementations have been described. Nevertheless, it will be understood that various modifications may be made without departing from the spirit and scope of the disclosed implementations. While preferred implementations of the present disclosure have been shown and described herein, it will be obvious to those skilled in the art that such implementations are provided by way of example only. Numerous variations, changes, and substitutions will now occur to those skilled in the art without departing from the described system. It should be understood that various alternatives to the implementations described herein may be employed in practicing the described system.

Moreover, the separation or integration of various system modules and components in the implementations described earlier should not be understood as requiring such separation or integration in all implementations, and it should be understood that the described components and systems can generally be integrated together in a single product or packaged into multiple products. Accordingly, the earlier description of example implementations does not define or constrain this disclosure. Other changes, substitutions, and alterations are also possible without departing from the spirit and scope of this disclosure.

What is claimed is:

1. A method comprising:

receiving, from an imaging device, image data depicting a space in a first state;

determining, for a portion of the space, a discrepancy between the first state and a second state of the space by performing a comparison of the image data and a first model representing the space in the second state;

generating a second model representing the space in the first state based on the first model and a subset of the image data corresponding to the discrepancy; and generating a virtual representation of the space based on the second model.

2. The method of claim 1, further comprising:

determining the discrepancy by assigning feature points to the portion of the space and identifying a difference between feature points in the image data and feature points defined by the first model to produce an identification of the discrepancy.

3. The method of claim 2, wherein identifying the difference between feature points includes determining a spatial distance between a feature point in the image data and a corresponding location in the first model.

4. The method of claim 3, wherein identifying the difference between feature points includes distinguishing the discrepancy from a geometric misalignment based on a nearest-neighbor segmentation difference.

5. The method of claim 1, further comprising:

determining the subset of the image data by identifying a spatial region surrounding a change in the space indicated by the discrepancy, wherein the subset of the image data includes information within a set radius of a geometric point associated with the change.

6. The method of claim 5, wherein the subset of the image data is integrated into the second model based on a weighted value that reflects a confidence metric associated with the change.

7. The method of claim 1, further comprising:

generating the first model as a rough scene reconstruction based on an initial set of image data to provide a baseline for determining the discrepancy.

8. The method of claim 7, further comprising:

identifying an incomplete section of the first model;

determining a prompt to collect additional information based on the incomplete section; and providing the prompt to a user device to cause the imaging device to collect the additional information.

9. The method of claim 8, further comprising:

identifying a feature from a set of common images representing an environment similar to the space; and updating the incomplete section of the first model with the feature to fill a gap in the rough scene reconstruction.

10. The method of claim 1, wherein generating the virtual representation includes determining a point cloud or light field based on the second model.

11. The method of claim 10, wherein the virtual representation includes a biocular rendering generated based on the light field or the point cloud.

12. The method of claim 1, wherein the first model and the second model include neural radiance field models, and generating the second model includes providing the subset of the image data to the second model as incremental input to synchronize the second model with the first state of the space.

13. The method of claim 12, wherein the incremental input is integrated into the second model based on a weighted average that reflects a confidence metric associated with the discrepancy.

14. The method of claim 1, wherein the image data is received concurrently with a presentation of a pass-through view of the space to synchronize the first model with the space independently of a scanning command.

15. The method of claim 1, wherein generating the second model includes dynamically stitching a feature identified in the image data into the first model to maintain the virtual representation of the space.

16. The method of claim 1, wherein the second model is generated by updating the first model based on the discrepancy to maintain a continuous representation of the space between the second state and the first state.

17. A non-transitory computer-readable medium storing instructions that when executed by an electronic processor cause the electronic processor to execute operations, the operations comprising:

receiving, from an imaging device, image data depicting a space in a first state;

determining, for a portion of the space, a discrepancy between the first state and a second state of the space by performing a comparison of the image data and a first model representing the space in the second state;

generating a second model representing the space in the first state based on the first model and a subset of image data corresponding to the discrepancy; and generating a virtual representation of the space based on the second model.

18. The non-transitory computer-readable medium of claim 17, the operations further comprising:

identifying a displacement of an object within the portion of the space based on the discrepancy; and updating the first model based on the displacement.

19. A system comprising:

an imaging device; and an electronic processor configured to:

receive, from the imaging device, image data depicting a space in a first state;

determine, for a portion of the space, a discrepancy between the first state and a second state of the space by performing a comparison of the image data and a first model representing the space in the second state;

generate a second model representing the space in the first state based on the first model and a subset of the image data corresponding to the discrepancy; and generate a virtual representation of the space based on the second model.

20. The system of claim 19, wherein the electronic processor is further configured to determine the discrepancy by:

assigning feature points to the portion of the space, and distinguishing the discrepancy from a geometric misalignment by identifying a difference between the feature points in the image data and feature points defined by the first model based on a nearest-neighbor segmentation difference.

* * * * *